Jan. 21, 1969  M. SHEINKER  3,422,746

SUPERBROILER

Filed Aug. 8, 1966

INVENTOR.
MOSHE SHEINKER
BY Herzig, Walsh & Blackham
ATTORNEYS

United States Patent Office 3,422,746
Patented Jan. 21, 1969

3,422,746
SUPERBROILER
Moshe Sheinker, 846 N. Hudson Ave.,
Los Angeles, Calif. 90038
Filed Aug. 8, 1966, Ser. No. 570,979
U.S. Cl. 99—445                2 Claims
Int. Cl. A47j 36/16

ABSTRACT OF THE DISCLOSURE

The invention is a charcoal broiler particularly adapted for indoor usage. It comprises a frame which can be positioned over any conventional stove or burner and which supports particulate refractory material. The unit is constructed so as to provide at the particulate back, supporting means for a grill on which the broiling takes place. These means provide for supporting the grill in variable adjustable angular positions in which the melted fat leakage can drain off the lower edge of the grill into a trough. This eliminates any adjustable support means or obstruction at the front part of the grill.

---

This invention relates to a charcoal broiler, particularly for indoor usage. The charcoal broiler is of a unique and novel construction such that it can be installed and used over any gas-operated stove, the burner of which can be used as a gas source. The manner in which this is accomplished is described in detail hereinafter.

Having reference to the prior art, food broiling devices currently in use include the built-in type of broiler which is used in restaurants and luxury homes; the outdoor broiler also known as a barbecue; and the hibachi, which is designed for indoor operation.

The built-in broiler is expensive due to large installation area and materials required for its construction. On the other hand, once installed, its operation and maintenance are relatively inexpensive and simple. In this type of installation, a flame from a permanent gas source or fuel line is passed through stone charcoal to the broiled food. Smoke and smells of burning fat are easily suppressed by means of fans. Compared to the builtin device, the outdoor broiler or barbecue is less expensive. However, with this device, it is necessary to renew the supply of wooden charcoal with each usage. Its usage is limited to places where smoke and odor cause little irritation.

The hibachi is a unit constructed for indoor operation. It is operated by wooden charcoal and is equipped with an adjustable grill which allows the melted fat to drip through channels into a removable cup, thus making possible the indoor usage. It would not be possible to operate it indoors if the melted fat were allowed to drip down onto the burning charcoal.

The broiler of this invention is one that combines the effectiveness and utility of the various broilers described above, including the built-in type, the outdoor broiler or barbecue, and the hibachi. These results are achieved by virtue of the particular design and construction of the broiler of the invention. The broiler of this invention is not a fixed installation but is a unit so constructed that it can be installed or positioned over any gas-operated stove, the burner of which is used as a gas source.

In a preferred form of the invention, there is provided a frame which can be placed directly over one or more burners of a conventional gas stove. Supported in the frame on a removable screen is a quantity of stone charcoal or other refractory material through which the flame must make its way upwardly. Over the refractory material and the frame there is provided an adjustable grill or broiling plate where the broiling takes place. The grill is provided with channels enabling the melted fat leakage to be drained into a draining channel. Means are provided to hold the grill plate at an appropriate adjustable angle so as to make possible the fat leakage, and also at an adjustable height above the stone charcoal.

A removable collecting channel is provided for collecting the drained fat.

In the light of the foregoing, the primary object of the invention is to provide a simplified, but effective and improved gas fired broiler particularly adapted for indoor use and which combines the advantages and utilities of a built-in broiler and previously known outdoor and indoor broilers.

A further object is to provide a broiler, as set forth in the foregoing, having the advantageous characteristics that it is capable of quick installations; easy operation; inexpensive maintenance; and capable of producing high quality cooked food.

A further object is to provide a broiler, as in the foregoing, constructed to be placed over any gas-operated stove burner which is used as the gas source, the broiler having means to support refractory material over which the flames pass to an overlying grill, or broiling plate.

Another object is to provide a broiler, as in the foregoing, wherein the overlying grill is provided with means for mounting it at variable heights above the refractory material and at variable angles to effectuate the desired drainage of fat.

Another object is to provide a broiler as in the foregoing, wherein the grill is provided with fat drainage channels and a removable fat collector channel.

Further objects and additional advantages of the invention will become apparent from the following detailed description and annexed drawings wherein.

Figure 1:
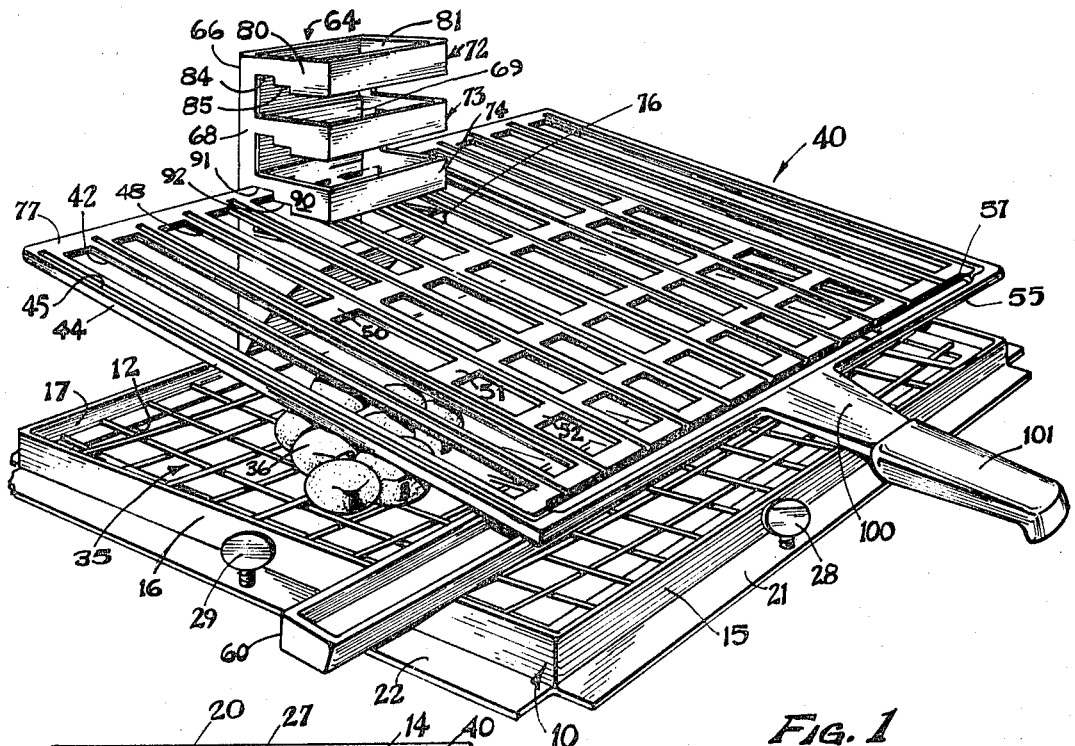
FIGURE 1 is a perspective view of a preferred form of the invention.

Referring to FIGURES 1 to 4 of the drawings, these figures show a preferred form of the invention. Numeral 10 designates a generally rectangular supporting frame which is open, but having a continuous inside flange as designated at 12. The frame has side walls as designated at 14, 15, 16 and 17, and extending from the bottom of these side walls are flanges 20, 21, 22 and 23. The flanges are provided with adjusting support screws which are manually adjustable as designated at 27, 28, 29 and 30. The frame 10 comprises a principal part of the broiler. It may be placed directly over one or more burners on a conventional gas stove and the frame may then be levelled by means of the adjusting screws 27, 28, 29 and 30. When placed over the burners of the stove, if such burners have removable grills as they often do, such grills or grids may be removed.

Supported on the continuous flange 12 inside of the frame 10 is a wire mesh screen designated generally by the numeral 35. The side edge parts of the screen are supported on the continuous flange 12 inside the frame 10. This wire mesh screen supports a suitable amount of refractory material such as stone charcoal as designated at 36, in a position within the frame 10 and over the flames from the burner or burners.

Figure 4:
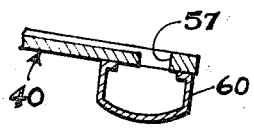
FIGURE 4 is a sectional view of a detail.

Supported over the frame 10 and over the refractory material 36 is a grill or a broiling plate designated generally by numeral 40. The broiling plate as will be described, is provided with means for supporting it at a variable or adjustable angle and also at a variable height above the refractory material. The purpose of the means for supporting it at a variable angle is to insure that the melted fat from the meat being broiled will drain properly as will be described. Also, it may be placed at different heights depending upon the adjustment of the gas burners and the intensity of the flame, and also possibly depending upon whether or not the user desires to have the meat cooked rare, medium, or well done. The broiling plate is a rectangular structure which may be in the form of a casting made of suitable metal. All of the parts may be constructed of suitable metal material and they may be in the form of castings. The broiling plate has longitudinal rectangular openings as designated at 42 along the sides thereof, the openings being separated by struts which are integral parts of the broiling plate as designated at 44. These parts or members have grooves or channels formed in them as designated at 45 to allow melted fat to drain from the broiling plate as will be described. Adjacent the side parts of the broiling plate the open spaces or openings 42 are continuous. Farther in, that is, near the center of the broiling plate 40, spaces as designated at 48 are interrupted by transverse members or parts as designated at 50, 51 and 52, leaving open spaces of shorter length than the spaces 42 nearer the side parts of the broiling plate 40. The transverse parts or members 50, 51, and 52 are closer together in the region nearer to the lower edge 55 of the broiling plate. All of the members or parts, however, have the grooves or channels as designated at 45. Adjacent the lower edge of the broiling plate as designated at 55, there is an elongated opening 57 which communicates with and receives the drip from all of the drain channels 45. Underneath this elongated opening there is provided a drain collecting channel or trough 60 having a cross sectional configuration as shown in FIGURE 4 for collecting all of the drained fat. Preferably, the drain channel or trough 60 is mounted to slide out in the manner of the drawer for removal of the drained fat and for cleaning.

The broiling plate 40 is mounted and held by an upright structure designated generally by the numeral 64. This structure may be in the form of a casting formed integrally with the frame 10, or it may be separately formed and attached thereto. This structure comprises an upright back part 66 having forwardly extending flanges 68 and 69, and also farwardly extending spaced rectangular open frame structures 72, 73 and 74. The extending frames 72, 73 and 74 are spaced apart and overlie and are spaced from an extending platform 76, which is below them and which extends outwardly from the upright part 66. The inner edge 77 of the broiling plate may be inserted in the spaces between the platform 76 and the frame 74 and between the several frames, as shown in FIGURE 1. The frames have side walls as designated at 80 and 81 for the frame 72. The inner parts of these side walls are notched out by way of rectangular notches as designated at 84 and 85 for the side wall 80 of the frame 72. It will be understood that the side wall 81 is similarly notched out and the side walls of the frames 73 and 74 are notched similarly to the side walls of the frame 72. One of the side walls of frame 74 is designated at 90 and its notches are designated at 91 and 92. FIGURE 1 illustrates the inner edge 77 of the broiling plate 40 and how it fits into the spaces between the holding frames or between the lower holding frame 74 and the platform 76. The inner edge or part 77 of the broiling plate 40 may be received in either the notches as illustrated by the notch 91 or the notches as illustrated by the notch 92. The notches as illustrated by the notch 91 having a greater depth, the broiling plate 40 is held at a steeper angle when accommodated in these notches than when accommodated in the notches as illustrated at notch 92 in FIGURE 1.

At the lower edge of the broiling plate 40, it has an extending handle part 100 to which is secured a grip 101 which may be made of heat resistant or insulating material.

Figure 2:
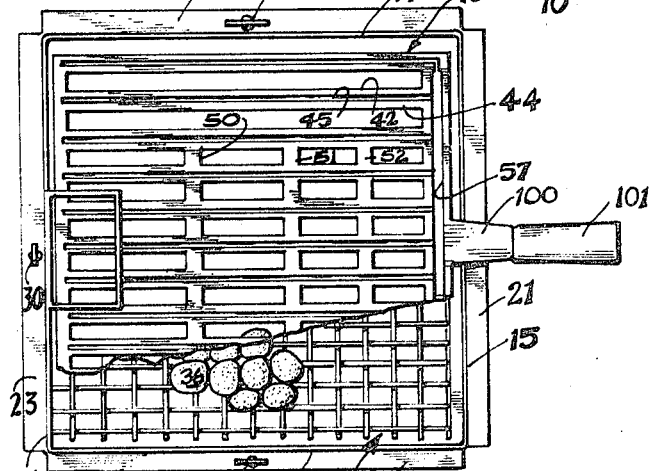
FIGURE 2 is a plan view of the form of the invention shown in FIGURE 1.
Figure 3:
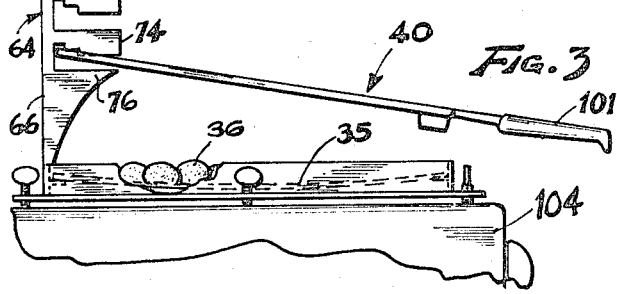
FIGURE 3 is a side elevational view of the form of the invention of FIGURES 1 and 2.

FIGURES 1, 2 and 3 illustrate a typical position of the broiler over a stove such as generally indicated at 104 in FIGURE 3. The broiler is over one or more burners as described, and is levelled by adjustment of the levelling screws. The flames come up through the screen 35 and over the refractory material shown by way of example, as the stone charcoal 36. The meat to be broiled is of course placed on the broiling plate, which is set as described at a suitable angle and at a suitable height above the stone refractory material. The angle of tilt is adjusted to secure proper drainage of the fat through the drain channels down to the collector. The height is set as described, depending upon the intensity of the flame from the burner or burners and depending upon whether the user desires to have the meat cooked rare, medium or well done. The openings in the broiling plate 40 are such that desired broiling of the meat is realized. It has been found that with the broiling plate constructed as shown and described, the melted fat and drip from the meat will seek out the members extending between the inner and outer edges of the broiling plate and will drain down through the channels in these members rather than dripping down through onto the stone charcoal. Thus, the operation is satisfactory without undesirable odors and smoke resulting from fat being burned by dripping into the flames and onto the stone charcoal refractory material.

From the foregoing those skilled in the art will observe that the invention achieves and realizes all of the objects and advantages as set forth in the foregoing. The broiler may be used with any gas fired stove in the manner described. Very desirable results can be realized with the broiler, the advantages of a built-in broiler and previously known outdoor and indoor broilers being combined. The adjustability of the broiling plate makes it easy and convenient to accommodate the broiler to different degrees of heating provided by a gas stove and to accommodate to the user's taste as to the cooking of the meat.

The device is of relatively simple construction being easy and economical to fabricate and produce. It requires little or no skill and maintenance of the unit is simplified as well as is cleaning and upkeep thereof.

The foregoing disclosure is representative of a preferred form of the invention and is to be interpreted in an illustrative rather than in a limiting sense, the invention to be accorded the full scope of the claims appended hereto.

What is claimed is:

1. A broiling device adapted for use with conventional gas stoves comprising a frame constructed to be placed over one or more burners of a gas stove, the said frame having means having openings therein for supporting particulate refractory material in a position to be exposed to flames from the stove, a broiling plate for supporting food to be cooked and means for supporting the broiling plate at an angle over the refractory material to provide for drainage of melted fat, said support means for the broiling plate comprising an upright extending upwardly from said frame, and the upright having a plurality of spaced inwardly protruding extensions, said extensions having notches of different depths provided in their lower edges whereby the edge part of the broiling plate may be inserted into spaces between said extensions with the inner edge of the broiling plate accommodated in notches of greater or lesser depth whereby to adjust the angle of support of the broiling plate.

2. A device as in claim 1 wherein said grill has elongated openings therein and members having elongated channels for draining fat towards the lower edge of the grill.

References Cited

UNITED STATES PATENTS 2,425,036   8/1947   Howe.

(Other references on following page)

UNITED STATES PATENTS

| | | |
|---|---|---|
| 2,827,846 | 3/1958 | Karkling. |
| 2,868,189 | 1/1959 | Watrous _____ 126—25 |
| 2,998,001 | 8/1961 | Lofgren et al. _____ 126—25 |
| 806,475 | 12/1905 | Köneman _____ 99—446 |
| 1,263,331 | 4/1918 | Lindroth _____ 126—41 X |
| 1,422,835 | 7/1922 | Condy _____ 99—445 |
| 1,608,309 | 11/1926 | Dickey. |
| 2,180,868 | 11/1939 | Dunning et al. |
| 2,893,373 | 7/1959 | Rundle _____ 126—25 X |
| 2,898,846 | 8/1959 | Del Francia _____ 126—41 X |

FOREIGN PATENTS 3,969  3/1896  Great Britain.

WALTER A. SCHEEL, *Primary Examiner.*

JOHN M. NEARY, *Assistant Examiner.*

U.S. Cl. X.R.

99—400, 446